Aug. 17, 1937. E. THALMANN 2,090,434
SCREW PRESS FOR WORKING PLASTIC MASSES
Filed Feb. 29, 1936
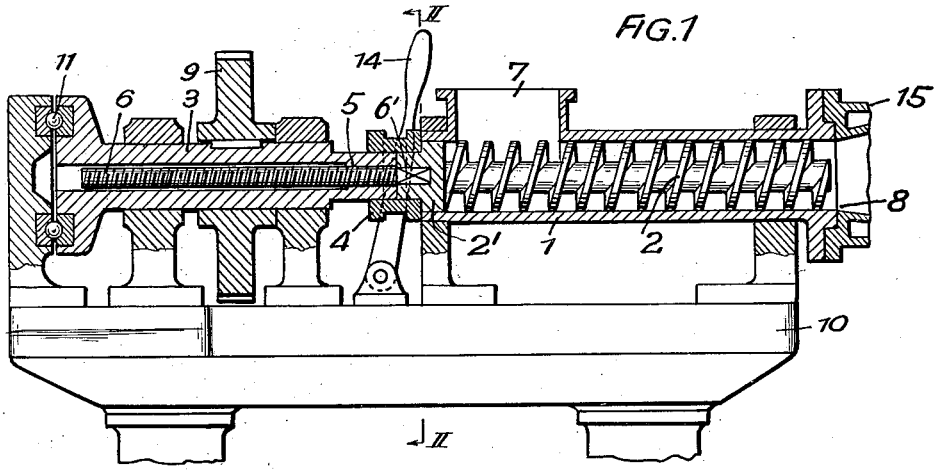
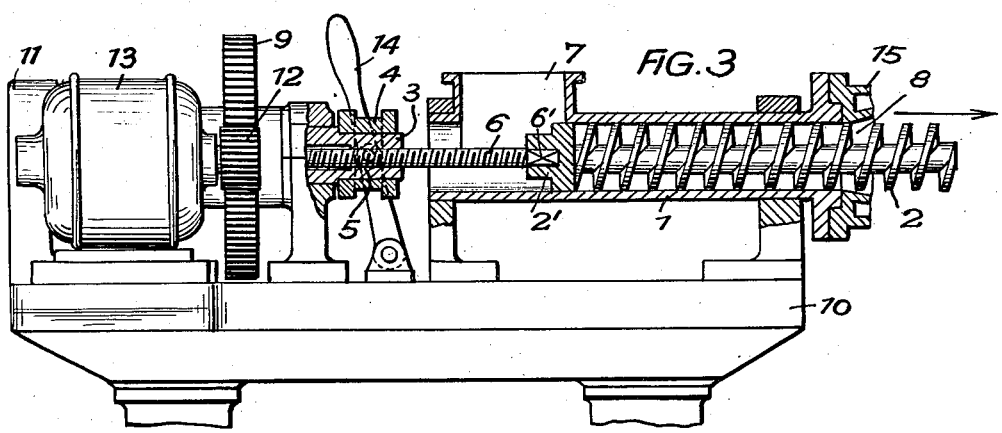
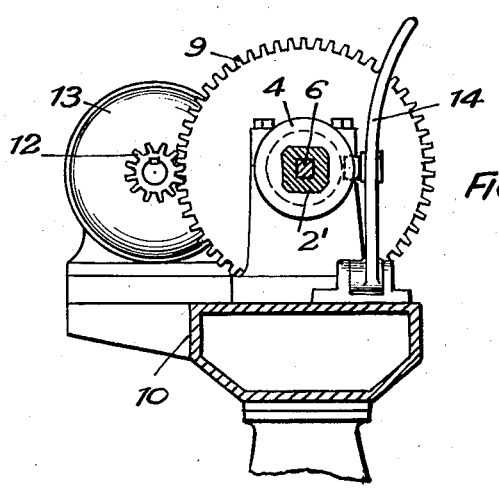
INVENTOR:
Emil Thalmann,
By Sommers & Young,
Attys.

Patented Aug. 17, 1937

2,090,434

UNITED STATES PATENT OFFICE 2,090,434

SCREW PRESS FOR WORKING PLASTIC MASSES

Emil Thalmann, Niederuzwil, Switzerland, assignor to the firm Gebruder Bühler, Uzwil, Switzerland Application February 29, 1936, Serial No. 66,468
In Germany March 2, 1935

4 Claims. (Cl. 18—12)

This invention relates to screw presses for working plastic masses.

In screw presses for working plastic masses, for example, for working dough, soapy masses or the like into definite shape, it is essential that the press worm can be easily removed from the surrounding casing for being cleaned. To this end, it has been proposed to divide the worm casing in the axial direction, for example, into a lower and an upper half.

However, the pressures arising inside the worm casing are very high exceeding, for example, 100 kilograms per square centimeter and more, and the connection between the separate parts of the casing must, therefore, be extraordinarily sturdy, which results in heavy and expensive constructions of the worm casing, and on the other hand renders sealing of the joints between the parts of the casing against the existing pressures difficult.

The object of the present invention is to eliminate these drawbacks.

According to this invention, in the screw press for working plastic masses provision is made for removing the press worm from the worm casing by means of an ejector spindle.

In this way it is rendered possible to remove the press worm from an integral worm casing in an easy manner.

In the accompanying drawing a screw press to which the invention is applied is illustrated by way of example only, in which Fig. 1 shows a vertical section of the screw press, Fig. 2 shows a section on the line II—II in Fig. 1, and Fig. 3 is a fragmentary section showing parts of Fig. 1 in different relative positions.

1 designates a cylindrical casing in which the press worm 2 is mounted. The driving shaft 3 of the worm 2, which is coaxial with the latter, is adapted to be coupled to a terminal coupling head 2' of the worm 2 by an annular coupling member 4 which slidingly engages over the adjoining square ends of the head 2' and the shaft 3 by means of its mating inner wall. The member 4 can be slid to and fro into and out of engagement with the head 2' by means of a control lever 14.

The drive shaft 3 is hollow and carries at its end adjacent to the head 2' an interior thread 5. Into the interior thread 5 an ejector spindle 6 is screwed which carries at its end outside of the drive shaft facing the head 2' a square coupling head 6' by means of which the spindle engages into a corresponding recess of the head 2'. By numeral 7 the feed hopper is designated, whereas 8 refers to the delivery socket of the screw press which opens to a sizing head 15 for the finished dough.

Driving movement is imparted to the shaft 3 by means of a spur gear wheel 9 which meshes with a pinion 12 driven by an electric motor 13 which is mounted in the frame 10 of the press. For counteracting the reaction of the operating press worm, at the rear end of the press a thrust bearing 11 is arranged against which the shaft 3 abuts.

When the coupling member 4 is moved into position of engagement with the head 2', the press worm 2 is coupled to the driving shaft 3 by means of this head. Thereupon, the parts 4, 2 and 3 form a rigid assembly, so that the press worm 2 and the ejector spindle 6, which engages into the head 2', are turned in unison with the shaft 3.

When, however, the coupling member 4 is disengaged from the head 2', the positive operative connection of the press worm 2 with the driving shaft 3 is interrupted. Consequently, two different ways of transmitting the driving movement are feasible in that either only the press worm 2 is turned together with the shaft 3 through the intermediary of the ejector spindle 6 and the thread 5 or that the press worm 2 is kept from rotation by jamming action of dough residues still present in the press casing after the main portion of the dough has been expelled through the delivery socket 8 at the end of a predetermined period of operation of the press. In the latter case the ejector spindle 6 is screwed forwardly in the axial direction of the press, and the press worm 2 is advanced together with it, in that the interior thread 5 is right or left handed depending on whether the gear 9 moves clockwise or counterclockwise, when viewed from the rear end of the press. The pitch of the interior thread 5 is, like that of the corresponding thread on the spindle 6, kept down to a value small enough that in every practical case the frictional resistance opposed to a rotational movement of the press worm that might be caused by the rotating driving shaft suffices to prevent such rotation of the worm 2 in which way is ensured that the latter is removed from the casing 1 through the delivery socket 8 by means of the axially advancing ejector spindle 6, when the coupling member is disconnected (Fig. 3).

This arrangement permits of always readily pushing the press worm out of the casing even if tenacious material has been worked in the press, which is very important particularly for machines, as screw presses for the purpose described, which require frequent cleaning. There is no risk of damaging the press worm and the ejector spindle during the removing operation.

What I claim is:

1. In a screw press for working plastic masses, in combination, a casing, a press screw axially displaceably arranged in said casing, driving means for rotating said press screw relative to said casing, means including a screw threaded ejector spindle adapted to be advanced longitudinally of said casing for pushing said press screw out of the casing, said driving means having a screw engaging the screw threads of said ejector spindle, means connecting said press screw and said ejector spindle for common rotation, and coupling and uncoupling means intercalated between said press screw and said driving means for uncoupling said screw and spindle from said driving means, whereby the driving means turns relatively to said spindle and screw and the spindle feeds the screw out of the casing longitudinally.

2. In a screw press for working plastic material, in combination, a casing, a screw in said casing, and axially movable therein, a spindle drivingly connected with said screw coaxially, a hollow shaft having internal screw threads, said spindle extending into said hollow shaft and having external screw threads engaging with said threads of the shaft, a motor for rotating said shaft, a coupling member for selectively coupling the hollow shaft with the screw to rotate said screw in the casing, and for uncoupling said shaft from said screw, whereby as said shaft is turned by said motor the spindle screws out of said shaft and the screw is moved longitudinally out of said casing.

3. In a screw press for working plastic material, in combination, a casing, a screw in said casing, and axially movable therein, said screw having a coupling head at one end, a spindle drivingly connected with said screw coaxially, a hollow shaft having internal screw threads, said spindle extending into said hollow shaft and having external screw threads engaging with said threads of the shaft, said spindle also having a head outside of said shaft for connecting the spindle with the screw, said shaft having a portion of non-circular cross section the end adjacent the coupling head of the screw, a motor for rotating said shaft, a coupling member slidable on the non-circular portion of the shaft and conforming interiorly with the shape thereof, said coupling member having a portion conforming in shape to a portion of the screw coupling head, said coupling member selectively coupling the hollow shaft with the screw to rotate said screw in the casing, and for uncoupling said shaft from said screw, whereby as said shaft is turned by said motor the spindle screws out of said shaft and the screw is moved longitudinally out of said casing.

4. In a screw press for working plastic material, in combination, a casing, a screw in said casing, and axially movable therein, a spindle drivingly connected with said screw coaxially, a hollow shaft having internal screw threads, said spindle extending into said hollow shaft and having external screw threads engaging with said threads of the shaft, a motor for rotating said shaft, a coupling member for selectively coupling the hollow shaft with the screw to rotate said screw in the casing, and for uncoupling said shaft from said screw, a thrust bearing at the opposite end of said shaft from said screw for carrying the axial working force of said screw, whereby as said shaft is turned by said motor the spindle screws out of said shaft and the screw is moved longitudinally out of said casing.

EMIL THALMANN.